(12) United States Patent
Zucker et al.

(10) Patent No.: US 11,019,942 B1
(45) Date of Patent: Jun. 1, 2021

(54) CUSHIONS FOR SAFE, SANITARY TRANSPORTATION OF CHILDREN

(71) Applicant: Pediatric Medical LLC, Decatur, GA (US)

(72) Inventors: Stefanie Zucker, Decatur, GA (US); Nigel J. Flynn, Lawrenceville, GA (US)

(73) Assignee: PEDIATRIC MEDICAL LLC, Decatur, GA (US)

( * ) Notice: Subject to any disclaimer, the term of this patent is extended or adjusted under 35 U.S.C. 154(b) by 259 days.

(21) Appl. No.: 16/418,939

(22) Filed: May 21, 2019

Related U.S. Application Data

(60) Provisional application No. 62/674,391, filed on May 21, 2018.

(51) Int. Cl.
| | |
|---|---|
| *A61G 1/01* | (2006.01) |
| *B32B 3/26* | (2006.01) |
| *B32B 5/02* | (2006.01) |
| *B32B 5/06* | (2006.01) |
| *B32B 5/24* | (2006.01) |
| *B32B 27/06* | (2006.01) |
| *B32B 27/12* | (2006.01) |
| *B32B 27/30* | (2006.01) |
| *B32B 27/40* | (2006.01) |
| *A61G 1/04* | (2006.01) |
| *A47D 15/00* | (2006.01) |

(52) U.S. Cl.
CPC ......... *A47D 15/005* (2013.01); *A47D 15/001* (2013.01); *A61G 1/01* (2013.01); *A61G 1/04* (2013.01); *B32B 3/266* (2013.01); *B32B 5/022* (2013.01); *B32B 5/06* (2013.01); *B32B 5/245* (2013.01); *B32B 27/065* (2013.01); *B32B 27/12* (2013.01); *B32B 27/304* (2013.01); *B32B 27/40* (2013.01); *A61G 2200/14* (2013.01); *B32B 2250/04* (2013.01); *B32B 2250/24* (2013.01); *B32B 2266/0278* (2013.01); *B32B 2307/51* (2013.01); *B32B 2307/726* (2013.01); *B32B 2307/7265* (2013.01); *B32B 2307/732* (2013.01)

(58) Field of Classification Search
CPC ........ A61G 1/01; A61G 1/04; A61G 2200/14; B32B 3/266; B32B 27/065; B32B 27/12; B32B 27/304; B32B 27/40; B32B 5/022; B32B 5/06; B32B 5/245; B32B 2250/04; B32B 2250/24; B32B 2307/726; B32B 2307/7265; B32B 2307/732; B32B 2307/51; B32B 2266/0278; A47D 15/001; A47D 15/005

See application file for complete search history.

(56) References Cited

U.S. PATENT DOCUMENTS

| | | | |
|---|---|---|---|
| 2,787,506 | A | 4/1957 | Travisano |
| 3,146,468 | A | 9/1964 | Siade |
| 3,476,367 | A | 11/1969 | Fleissner |
| 3,577,873 | A | 5/1971 | Waters |

(Continued)

FOREIGN PATENT DOCUMENTS

| | | |
|---|---|---|
| FR | 2810221 | 12/2001 |
| WO | WO9321871 | 11/1993 |

*Primary Examiner* — David R Hare
(74) *Attorney, Agent, or Firm* — Withers & Keys, LLC

(57) ABSTRACT

Cushions that provide safe, sanitary transportation of children are disclosed. Methods of making and using cushions that provide safe, sanitary transportation of children are also disclosed.

18 Claims, 6 Drawing Sheets

(56) References Cited

U.S. PATENT DOCUMENTS

| | | | |
|---|---|---|---|
| 3,812,001 A * | 5/1974 | Ryan | A61F 13/532 428/178 |
| 3,989,867 A * | 11/1976 | Sisson | A61F 13/5146 428/132 |
| 4,045,833 A * | 9/1977 | Mesek | A61F 5/485 5/484 |
| 4,173,046 A * | 11/1979 | Gallagher | A61F 5/485 5/484 |
| 4,234,982 A | 11/1980 | Bez et al. | |
| 4,256,096 A | 3/1981 | Buddle | |
| 4,300,782 A | 11/1981 | Pioth | |
| 4,627,426 A * | 12/1986 | Wegener | A61B 46/00 128/849 |
| 4,667,356 A | 5/1987 | Holmquist | |
| 4,670,921 A | 6/1987 | Avni et al. | |
| 4,679,260 A | 7/1987 | Frettem | |
| D292,612 S | 10/1987 | Fitsch | |
| D293,561 S | 1/1988 | Bulgari | |
| 4,747,172 A | 5/1988 | Hohol et al. | |
| 4,757,811 A | 7/1988 | Clark | |
| 4,772,281 A * | 9/1988 | Armstead | A61F 5/485 5/484 |
| 4,836,707 A | 6/1989 | Myers | |
| 4,882,213 A | 11/1989 | Gaddis et al. | |
| 4,883,701 A | 11/1989 | Rankin et al. | |
| 4,885,200 A | 12/1989 | Perdelwitz et al. | |
| 4,886,697 A | 12/1989 | Perdewitz et al. | |
| 4,891,454 A | 1/1990 | Perdelwitz et al. | |
| 4,892,769 A | 1/1990 | Perdelwitz et al. | |
| 4,912,787 A | 4/1990 | Bradcovich | |
| 4,921,295 A | 5/1990 | Stollenwerk | |
| 4,947,418 A | 8/1990 | Barr et al. | |
| 4,961,982 A * | 10/1990 | Taylor | A61F 5/485 112/475.08 |
| 4,977,630 A | 12/1990 | Oswalt et al. | |
| 4,979,520 A | 12/1990 | Boone, Jr. et al. | |
| 5,014,724 A | 5/1991 | Miller | |
| 5,048,136 A | 9/1991 | Popitz | |
| 5,092,008 A * | 3/1992 | Okubo | A47C 27/005 5/484 |
| 5,107,558 A | 4/1992 | Lück | |
| 5,127,120 A | 7/1992 | Mason | |
| 5,160,185 A | 11/1992 | Stang | |
| 5,232,243 A | 8/1993 | Blackburn et al. | |
| 5,283,919 A | 2/1994 | Grant | |
| 5,387,177 A | 2/1995 | Dunn | |
| 5,388,296 A * | 2/1995 | Mansour | A47C 21/046 5/484 |
| 5,395,154 A | 3/1995 | Wang | |
| 5,400,448 A | 3/1995 | Zwickey | |
| 5,481,770 A | 1/1996 | Ahlsten | |
| 5,496,092 A | 3/1996 | Williams et al. | |
| 5,664,408 A * | 9/1997 | Chesterfield | B65B 31/06 53/512 |
| 5,685,257 A * | 11/1997 | Feibus | A01K 1/0353 119/28.5 |
| 5,713,630 A * | 2/1998 | Kvalvik | A47D 15/006 297/254 |
| 5,749,374 A | 5/1998 | Schneider | |
| 5,845,351 A | 12/1998 | Berta et al. | |
| 5,860,176 A | 1/1999 | Norberg | |
| 5,937,465 A | 8/1999 | Carew et al. | |
| 6,092,525 A | 7/2000 | Church | |
| 6,093,895 A | 7/2000 | Niosi | |
| 6,173,462 B1 | 1/2001 | Huang et al. | |
| 6,260,220 B1 | 7/2001 | Lamb et al. | |
| 6,345,856 B1 | 2/2002 | Minai | |
| 6,377,177 B1 | 4/2002 | Broussard et al. | |
| 6,431,632 B1 | 8/2002 | Kozikowski et al. | |
| 6,447,060 B1 | 9/2002 | Vila et al. | |
| 6,471,298 B2 | 10/2002 | Carine et al. | |
| 6,493,890 B2 | 12/2002 | Smeed | |
| 6,578,219 B1 | 6/2003 | Gabel et al. | |
| 6,848,134 B1 | 2/2005 | Schenck | |
| 7,120,952 B1 * | 10/2006 | Bass | A47C 27/006 5/484 |
| 7,185,604 B2 * | 3/2007 | Holte | A01K 1/0353 119/28.5 |
| 7,281,235 B2 | 10/2007 | Zucker et al. | |
| 8,464,657 B1 * | 6/2013 | King | A01K 1/0353 119/28.5 |
| 9,023,003 B1 * | 5/2015 | Bracci | A61F 13/56 604/356 |
| 2003/0135930 A1 | 7/2003 | Varese et al. | |
| 2004/0177450 A1 | 9/2004 | Salvatini et al. | |
| 2005/0193491 A1* | 9/2005 | Zucker | A61G 1/04 5/603 |
| 2005/0204471 A1* | 9/2005 | Ruiz | A47D 5/006 5/420 |
| 2008/0086817 A1* | 4/2008 | Zucker | A61G 7/0504 5/603 |
| 2008/0086984 A1* | 4/2008 | Andria | B65B 35/50 53/434 |
| 2011/0056022 A1 | 3/2011 | Ayette et al. | |
| 2012/0084920 A1 | 4/2012 | Zucker et al. | |

\* cited by examiner

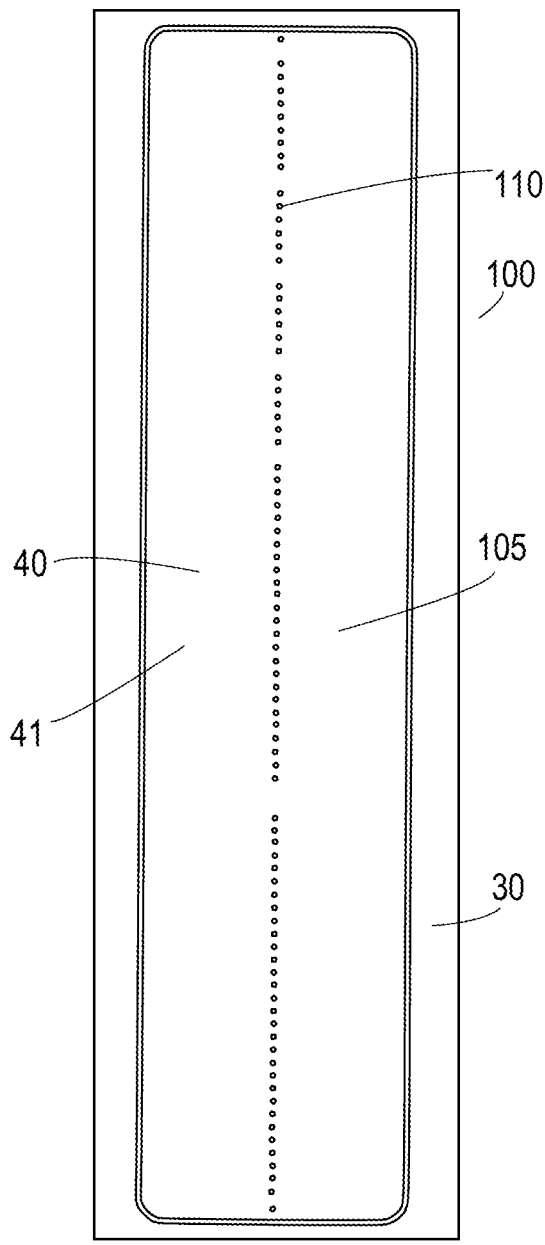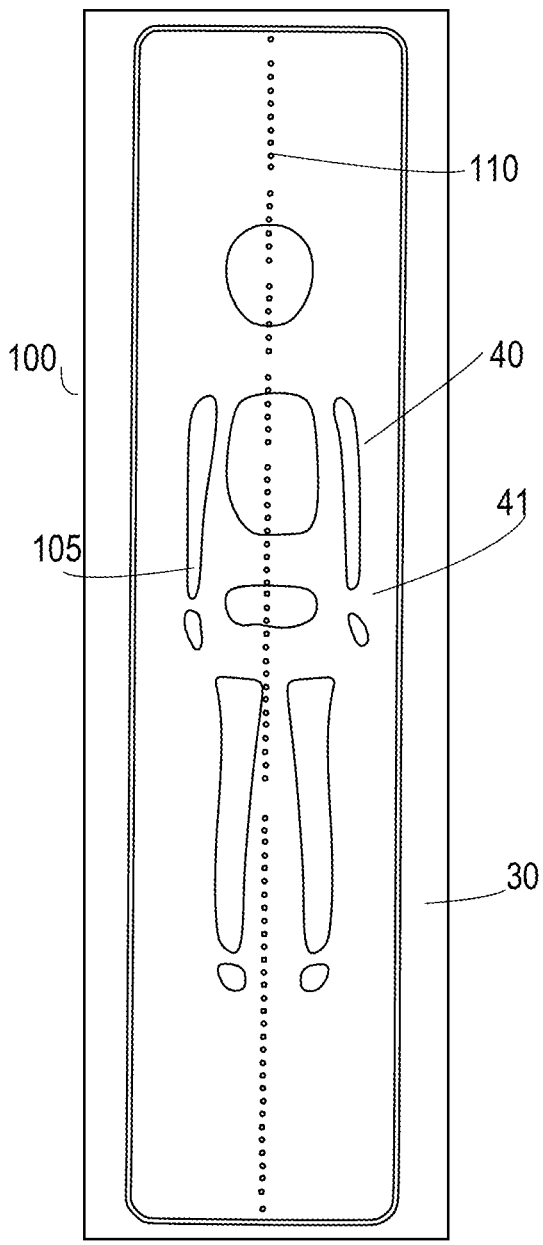
FIG. 5
FIG. 6

CUSHIONS FOR SAFE, SANITARY TRANSPORTATION OF CHILDREN

CROSS-REFERENCE TO RELATED APPLICATIONS

This patent application claims the benefit of priority to U.S. Provisional Patent Application Ser. No. 62/674,391 filed on May 21, 2018 and entitled "CUSHIONS FOR SAFE, SANITARY TRANSPORTATION OF CHILDREN," the subject matter of which is hereby incorporated by reference in its entirety.

FIELD OF THE INVENTION

The field of the present invention is the field of methods and devices for improving the safe and sanitary transportation of children.

BACKGROUND OF THE INVENTION

Efforts continue to establish standards for safe transport of children on emergency vehicles. Preliminary work highlights the need to be able to secure the torso and protect the head, neck and spine of a child if the emergency vehicle were to be in an accident—whether the child is 5 pounds (lbs) or 99 lbs (i.e., 2.3 kilograms (kg)-45 kg).

Some devices to-date provide some general protection for a child from ejection from the stretcher or even from the vehicle, however they provide little to no protection against a head or neck injury from a lateral impact. Additionally there is not a single device capable of securing a 5 lbs to 95 lbs child for transport that protects against a side impact collision, yet still allows the child some independent movement.

SUMMARY OF THE INVENTION

The present invention addresses some of the problems in the state of the art of safe transportation of children by the discovery of cushions that provide one or more of the following advantages: (1) fits into an enclosure used for transporting children that decreases the child's lateral movement, (2) provides increased stability to the head, neck and spine, (3) absorbs the shock energy from an external lateral blow, minimizing the transfer of force from point of impact across the body of the cushion and (4) provides for the absorption of bodily fluids, all without requiring full immobilization of the child. The present invention further allows removal of one or more sections from the cushion to facilitate airway intervention, if used in an emergency medical transport environment.

The cushion of the present invention desirably uses a memory-foam like material in a single-use disposable cushion to conform to each child's individual shape, restricting lateral movement of head neck and spine in a reclining or flat position. It also desirably includes liquid absorbing material and a liquid repelling liner to restrict the transfer of liquids onto any equipment below the cushion.

Moreover, the present invention provides a cushion that is designed to fit into an enclosure or device used for transporting children in a moving vehicle. In one exemplary embodiment of the present invention, the cushion of the present invention is designed to fit into the PedREST™ transporting device or a child seat for an ambulance. In another embodiment, the cushion of the present invention is designed to fit into an ordinary car seat. In yet a third embodiment, the cushion of the present invention is designed to fit into any child seat that will travel on public roads.

The present invention is directed to cushions that provide safe, sanitary transport of children in a transportable device (e.g., a child car seat, a child stretcher, etc.). In some desired embodiments, the cushion of the present invention comprises: an absorbent layer comprising fibrous material, superabsorbent material, or a combination of fibrous material and superabsorbent material; a foam layer such as a foam layer comprising a viscoelastic foam or a memory-foam or a memory-foam-like material; and a lowermost fluid-impervious layer. In other desired embodiments, the cushion of the present invention comprises the above layers, and an uppermost fluid pervious layer such as a nonwoven layer comprising fibers and an optional water-repellent material.

The present invention is further directed to methods of making cushions. In one embodiment, the method of making a cushion of the present invention comprises: assembling (i) an absorbent layer comprising fibrous material, superabsorbent material, or a combination of fibrous material and superabsorbent material, (ii) a foam layer comprising a viscoelastic foam or a memory-foam or a memory-foam-like material, and (iii) a lowermost fluid-impervious layer with one another to form an integrally connected unit. The method of making a cushion of the present invention may further comprise one or more additional method steps, such as assembling an uppermost fluid pervious layer with the above-mentioned layers to form an integral unit.

The present invention is even further directed to methods of using cushions of the present invention. In one embodiment, the method of using a cushion of the present invention comprises: positioning a cushion on a surface of a transportable device, the cushion providing motion-limiting and/or motion-isolating and fluid-absorbing properties to a child positioned on the cushion, wherein the cushion comprises: (i) an absorbent layer comprising fibrous material, superabsorbent material, or a combination of fibrous material and superabsorbent material, (ii) a foam layer comprising a viscoelastic material or a memory-foam or a memory-foam-like material, and (iii) a lowermost fluid-impervious layer.

Other features and advantages of the present invention will become apparent after a review of the following detailed description of the disclosed embodiments and the appended claims.

BRIEF DESCRIPTION OF THE FIGURES

The present invention is further described with reference to the appended figures, wherein:

FIG. 5 depicts a top view of another exemplary cushion of the present invention;

FIG. 6 depicts a top view of the exemplary cushion shown in FIG. 5 when an exemplary child is positioned on an upper surface of the exemplary cushion;

DETAILED DESCRIPTION OF THE INVENTION

Figure 1:
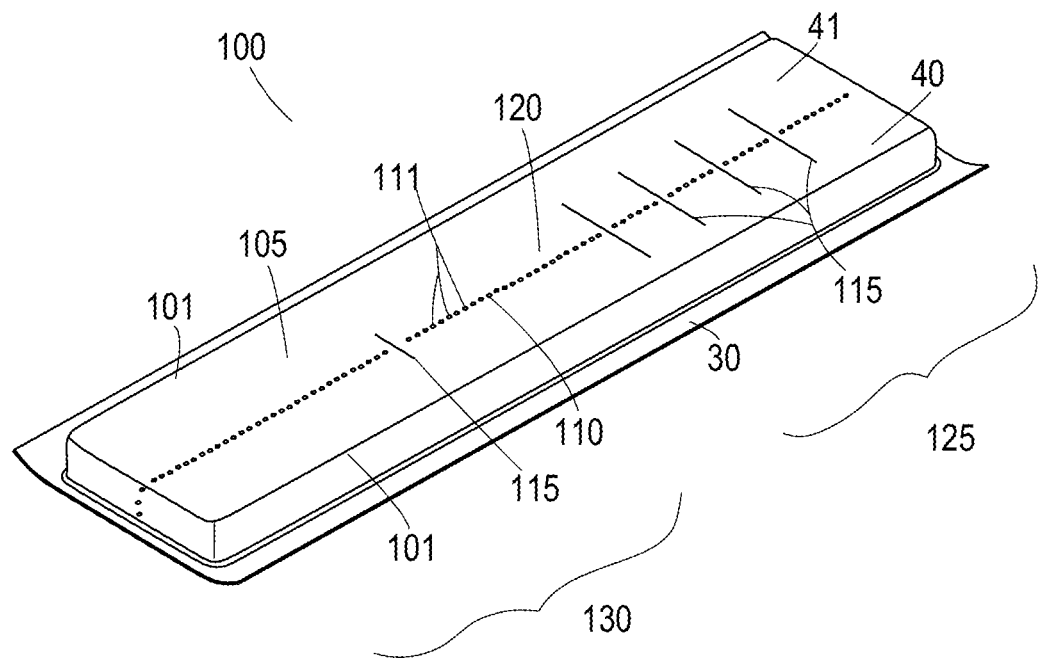
FIG. 1 depicts a perspective view of an exemplary cushion of the present invention.
Figure 2:
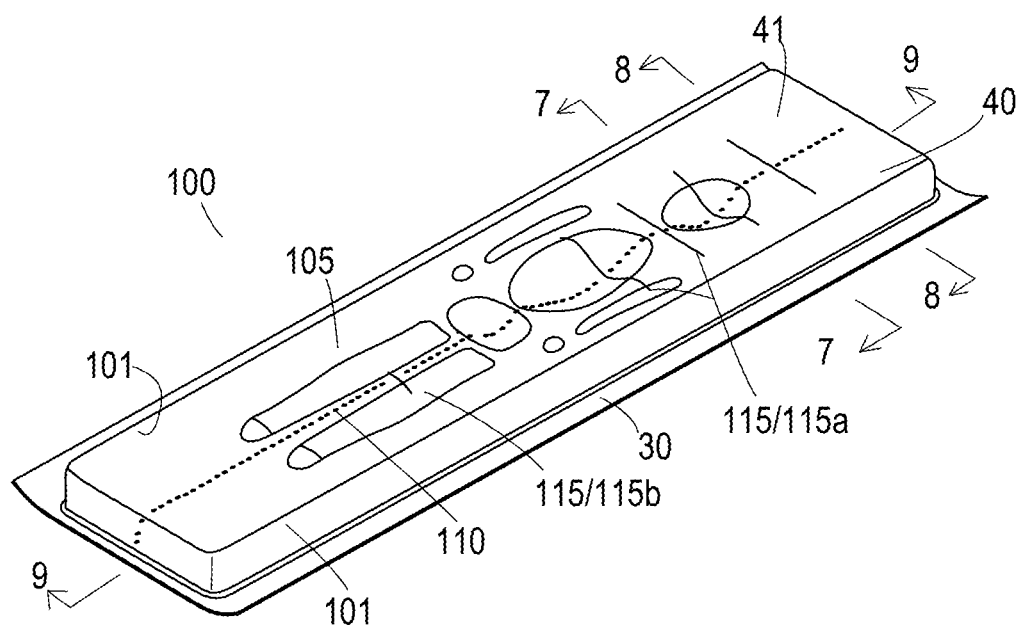
FIG. 2 depicts a perspective view of the exemplary cushion shown in FIG. 1 when an exemplary child is positioned on an upper surface of the exemplary cushion.
Figure 3:
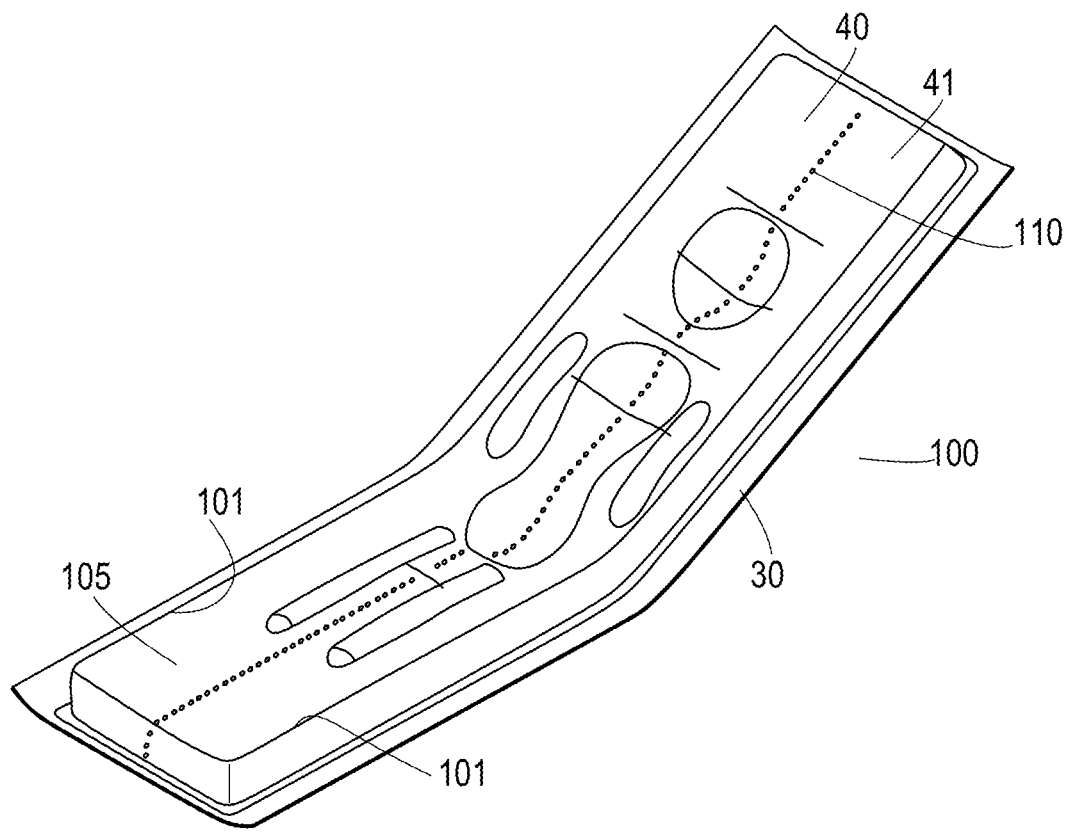
FIG. 3 depicts a perspective view of the exemplary cushion shown in FIG. 2 while in an inclined position.
Figure 4:
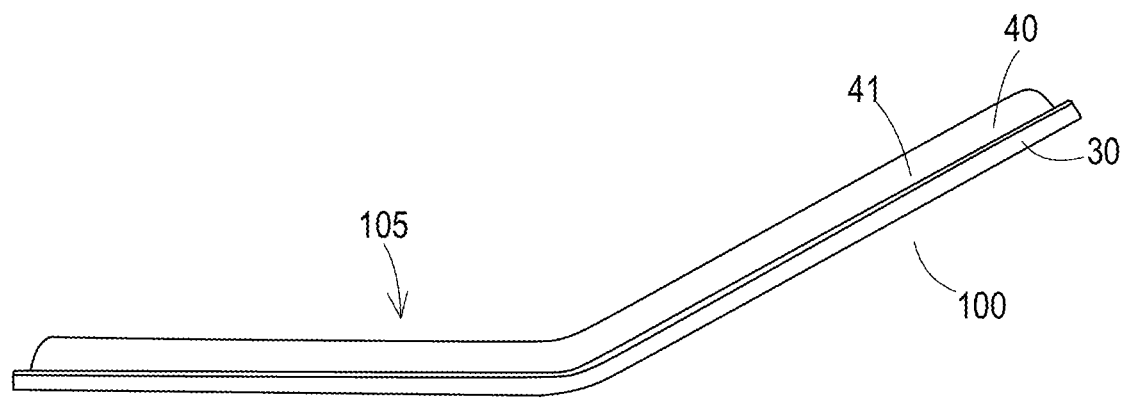
FIG. 4 depicts a side view of the exemplary cushion shown in FIG. 3.

The present invention is directed to cushions for use in the safe, sanitary transport of children. The present invention is further directed to methods of making, as well as methods of using cushions for use in the safe, sanitary transport of children.

As shown in the figures, and exemplified by exemplary cushion 100, the cushions of the present invention desirably comprise one or more of the following layers:

a. a top gauze-like layer (e.g., similar to a top layer or topsheet used in a diaper or chuck or disposable undergarment) that lets fluids pass through, but keeps the surface relatively dry;

b. an absorbent fluid acquisition and retention layer (e.g., similar to an absorbent layer that could be used in a diaper);

c. a foam layer comprising viscoelastic material or memory-foam or a memory-foam-like material; and d. a lowermost layer comprising a fluid-impervious liner material, which could be a polyvinyl chloride (PVC) or polyurethane laminate (PUL) or something similar, to prevent transmission of fluids and biomatter onto a child carrying unit and leakage onto the floor of a transport vehicle (e.g., a car or ambulance), keeping the area sanitary and in the case of emergency vehicles, making it safer for the attendants (avoid slipping) and minimize cleaning (and as a result decreasing time to return the ambulance to service). As used herein, the term "biomatter" is used to encompass any body fluids and/or solids exiting the human body.

In addition, the cushions of the present invention, as exemplified by exemplary cushion 100, provides one or more (or all) of the following advantages:

1) the ability to cradle a child, protecting the head, neck and spine by minimizing lateral motion thereof, in particular in case of a side-impact car accident (i.e., a "motion-limiting" property of the cushions of the present invention). Currently approximately 25% of car crashes with kids are side-impact, and FARS side-impact fatality rates for children are in the range of 30-42%;

2) the ability to absorb the shock energy at point of contact, minimizing the transference of force from an impact (e.g., a side impact) across the body of the cushion, lessening the potential blow and the resulting trauma to any other point of contact along the cushion (i.e., an "impact-minimizing" and/or "shock-absorbing" property of the cushions of the present invention);

3) the ability to be disposable and provide a single-use;

4) the ability to conform to the shape of each child, with the unit being capable of carrying a larger range of sizes of children, e.g., from 5 lb to 99 lb children;

5) the ability to assist in absorbing bodily fluids through the addition of an absorbent layer (e.g., similar to the absorbent layer used in diapers);

6) the ability for harness and/or safety belt straps to pass through the cushion at different heights, adjusting to the various sizes of children being transported;

7) the ability of the cushion to be easily torn and removed if needed via perforations (e.g., a tear line) down the center of the cushion. In an emergency vehicle use, this enables the child to be transferred onto a much firmer seat below if CPR is needed. Therefore, the child can ride comfortably and safely, and if needed, transfer to a more stable environment for CPR without removing them from the safety of the transport device; and 8) the ability of the cushion to be folded and individually vacuum packed to remove air and compress the cushion to a miniscule height for improved storage when needed, for example, within limited space in an ambulance. Upon opening of the package and exposure to air—the cushion will desirably return to full height and will not reduce back to its packaged state.

Further additional embodiments of the present invention are described below. It should be noted that the recitation of numerical ranges by endpoints in any of the embodiments disclosed herein includes all numbers subsumed within that range (e.g., the range about 1 to about 5 includes 1, 1.5, 2, 2.75, 3, 3.80, 4, and 5) and any range within that range (e.g., the range of about 1.5 to about 3.78 within the range of 1 to 5).

Additional Embodiments

Cushions:

1. A cushion 100 comprising: an absorbent layer 10 comprising fibrous material 11, superabsorbent material 12 (i.e., superabsorbent fibers and/or particles 12), or a combination of fibrous material 11 and superabsorbent material 12; a foam layer 20 comprising a viscoelastic foam or memory-foam or memory-foam-like material 21; and a lowermost fluid-impervious layer 30. As used herein, the term "memory-foam-like material" comprises a material that provides "motion-limiting" and/or "shock-absorbing" properties, and/or exhibits both elastic and viscous behavior when deformed.

2. The cushion 100 of embodiment 1, further comprising: an uppermost fluid pervious layer 40 comprising fiber-containing material with an optional repellent material that prevents backflow onto an upper surface 105 of the cushion 41. In some embodiments, the uppermost fluid pervious layer 40 comprising a nonwoven fabric similar to a topsheet used in a diaper. In some embodiments, the uppermost fluid pervious layer 40 comprising a nonwoven fabric and a water-repellent material on and/or within the nonwoven fabric. One suitable water-repellent material comprises a petrolatum (e.g., petroleum jelly) product with or without an alcohol (e.g., stearyl alcohol).

3. The cushion 100 of embodiment 2, wherein said absorbent layer 10 is below said uppermost fluid pervious layer 40, and said foam layer 20 is below said absorbent layer 10.

4. The cushion 100 of any one of embodiments 1 to 3, wherein said absorbent layer 10 comprises fibrous material 11 and superabsorbent material 12.

5. The cushion 100 of any one of embodiments 1 to 4, wherein said foam layer 20 comprising a viscoelastic material 21. Suitable viscoelastic materials 21 include, but are not limited to, foams (e.g., polyurethane foams, high-resilience polyfoam, polyether foams, etc.), polymers that have elastic properties such as Hyper-Elastic Polymer™ materials, elastic fibers, gels, and combinations thereof.

6. The cushion 100 of any one of embodiments 1 to 5, wherein said foam layer 20 comprising a viscoelastic foam material 21.

7. The cushion 100 of any one of embodiments 1 to 6, wherein said foam layer 20 further comprises fibers (not shown) distributed throughout the foam layer 20. Any fiber may be used as a component within the foam layer 20.

8. The cushion 100 of any one of embodiments 1 to 7, wherein said foam layer 20 further comprises a plurality of parallel channels 22 extending vertically thru said foam layer 20.

9. The cushion 100 of any one of embodiments 1 to 8, wherein said foam layer 20 further comprises a plurality of parallel channels 22 extending horizontally thru said foam layer 20 (not shown).

10. The cushion 100 of any one of embodiments 1 to 9, wherein said foam layer 20 further comprises a plurality of parallel channels 22 extending vertically and horizontally within said foam layer 20 (not shown).

11. The cushion 100 of any one of embodiments 8 to 10, wherein each of said parallel channels 22 has a cross-sectional shape comprising a circular shape, a triangular shape, a square shape, a rectangular shape, a star shape, an oval shape, or any combination thereof. It should be understood that the plurality of parallel channels 22 may have any cross-sectional shape or combination of cross-sectional shapes. It should be further understood that one or more parallel channels 22 within said plurality of parallel channels 22 may have a cross-sectional shape that changes along a length of the parallel channel 22 (e.g., from a circular cross-sectional shape to a square cross-sectional shape along a length of one or more parallel channels 22).

12. The cushion 100 of any one of embodiments 1 to 11, wherein said foam layer 20 further comprises a dissecting channel 23 extending (i) vertically thru said foam layer 20, (ii) along a length $L_{SA}$ of said foam layer 20, and (iii) in a central location 24 of said foam layer 20.

Figure 8:
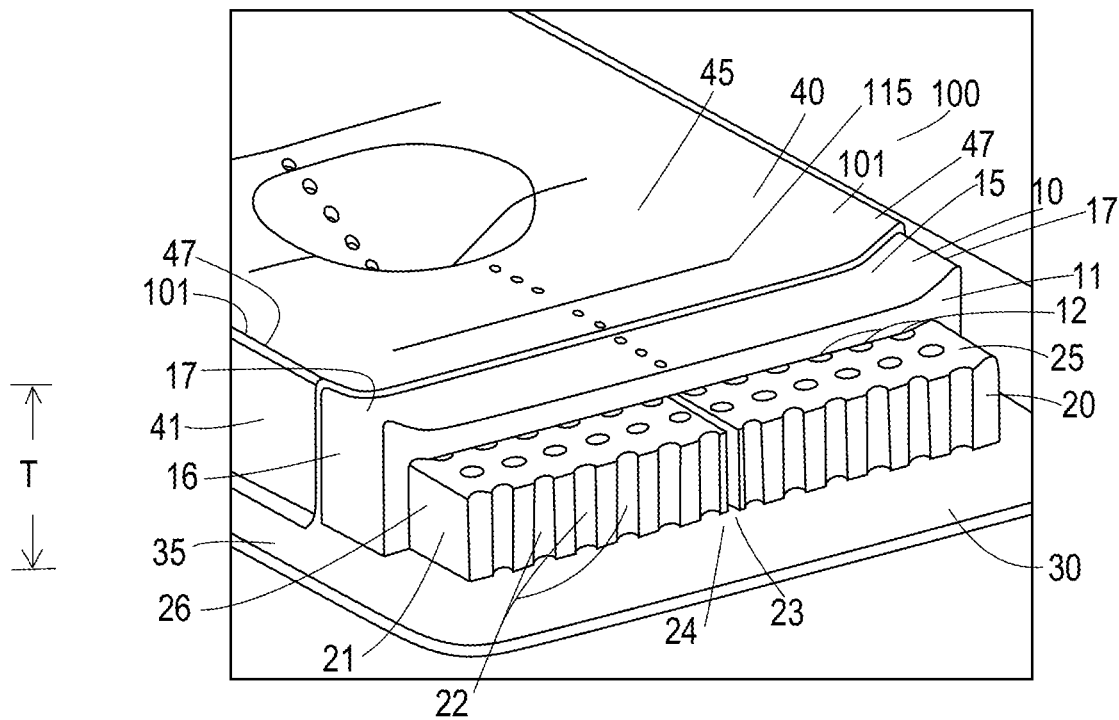
FIG. 8 depicts a cross-sectional view of exemplary layers within the exemplary cushion shown in FIG. 2 as viewed along line 8-8 shown in FIG. 2.
Figure 9:
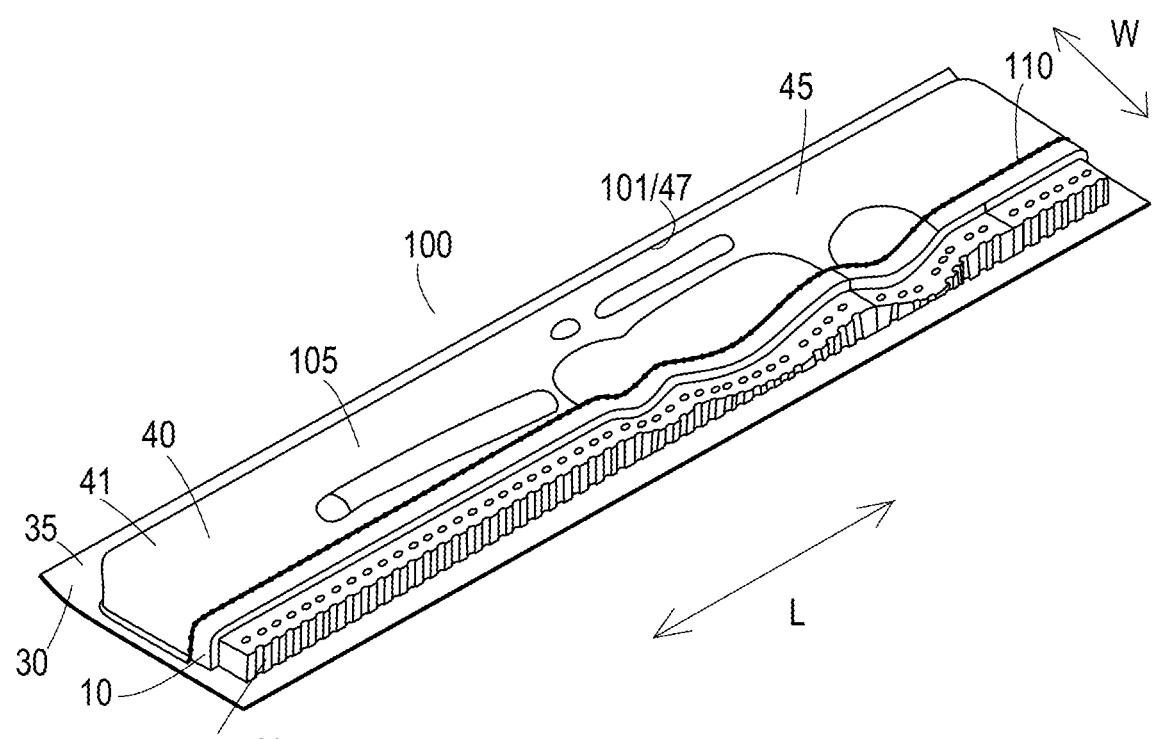
FIG. 9 depicts a cross-sectional perspective view of exemplary layers within the exemplary cushion shown in FIG. 2 as viewed along line 9-9 shown in FIG. 2.
Figure 10:
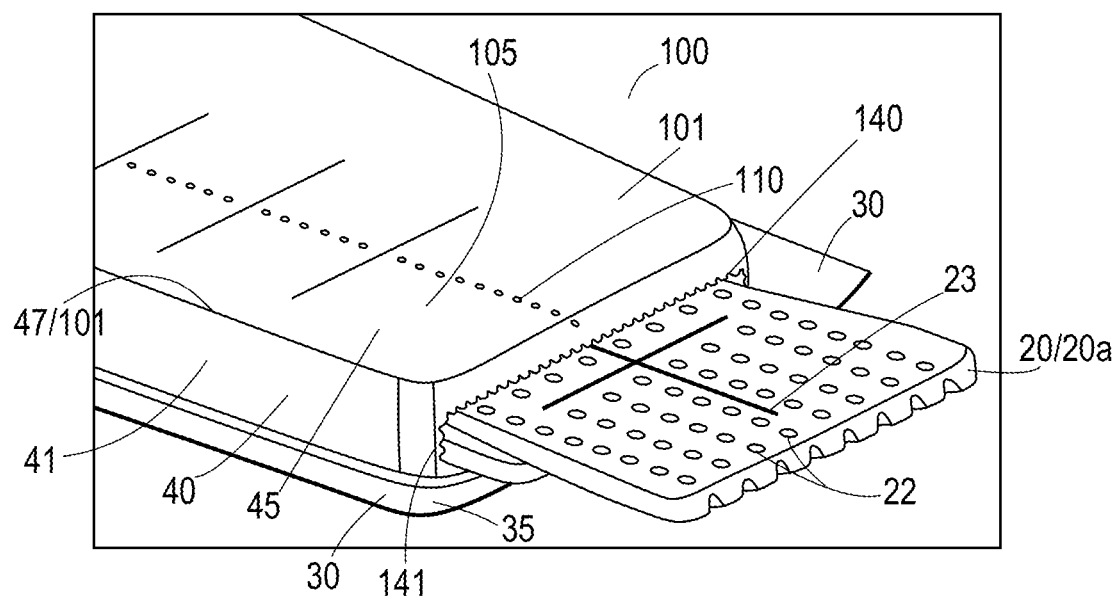
FIG. 10 depicts an end perspective view of the exemplary cushion shown in FIG. 1 with an exemplary closable pocket in an open position and two exemplary removable foam layer portions extending out from the exemplary closable pocket.
Figure 11:
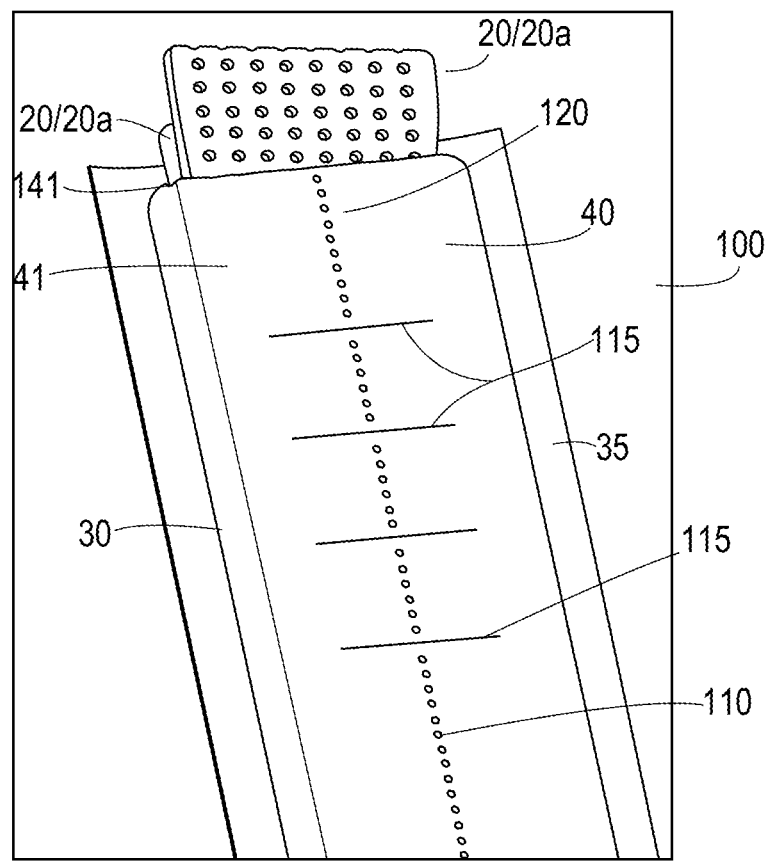
FIG. 11 depicts a frontal perspective view of the exemplary cushion shown in FIG. 10.

13. The cushion 100 of any one of embodiments 1 to 12, wherein said foam layer 20 has a foam layer length $L_{SA}$, a foam layer width $W_{SA}$, and a foam layer thickness $T_{SA}$, and said foam layer length $L_{SA}$ is greater than said foam layer width $W_{SA}$. Note all lengths, widths and thicknesses referred to herein extend in the length direction L, the width direction W and the thickness direction T shown, for example, in FIGS. 8-9.

14. The cushion 100 of embodiment 13, wherein said foam layer length $L_{SA}$ is from about 1.5 feet (ft) to about 6.0 ft (or any value between 1.5 ft and 6.0 ft, in increments of 0.1 ft, e.g., 2.3 ft, or any range of values between 1.5 ft and 6.0 ft, in increments of 0.1 ft, e.g., from 1.8 ft to about 4.2 ft); said foam layer width $W_{SA}$ is from about 1.0 ft to about 4.0 ft (or any value between 1.0 ft and 4.0 ft, in increments of 0.1 ft, e.g., 3.1 ft, or any range of values between 1.0 ft and 4.0 ft, in increments of 0.1 ft, e.g., from 1.8 ft to about 3.2 ft); and said foam layer thickness $T_{SA}$ is from about 0.6 inches (in) to about 6.0 in (or any value between 0.6 in and 6.0 in, in increments of 0.1 in, e.g., 2.5 in, or any range of values between 0.6 in and 6.0 in, in increments of 0.1 in, e.g., from 1.3 in to about 3.5 in).

15. The cushion 100 of any one of embodiments 1 to 14, wherein said absorbent layer 10 has an absorbent layer length $L_A$, an absorbent layer width $W_A$, and an absorbent layer thickness $T_A$, and said absorbent layer length $L_A$ is greater than said absorbent layer width $W_A$.

16. The cushion 100 of embodiment 15, wherein said absorbent layer length $L_A$ is from about 1.5 ft to about 6.0 ft (or any value between 1.5 ft and 6.0 ft, in increments of 0.1 ft, e.g., 2.3 ft, or any range of values between 1.5 ft and 6.0 ft, in increments of 0.1 ft, e.g., from 1.8 ft to about 4.2 ft); said absorbent layer width $W_A$ is from about 1.0 ft to about 4.0 ft (or any value between 1.0 ft and 4.0 ft, in increments of 0.1 ft, e.g., 3.1 ft, or any range of values between 1.0 ft and 4.0 ft, in increments of 0.1 ft, e.g., from 1.8 ft to about 3.2 ft); and said absorbent layer thickness $T_A$ is from about 0.1 in to about 2.0 in (or any value between 0.1 in to about 2.0 in, in increments of 0.1 in, e.g., 1.5 in, or any range of values between 0.1 in to about 2.0 in, in increments of 0.1 in, e.g., from 0.4 in to about 1.5 in).

17. The cushion 100 of any one of embodiments 2 to 16, wherein said uppermost fluid pervious layer 40 has an uppermost fluid pervious layer length $L_U$, an uppermost fluid pervious layer width $W_U$, and an uppermost fluid pervious layer thickness $T_U$, and said uppermost fluid pervious layer length $L_U$ is greater than said uppermost fluid pervious layer width $W_U$.

18. The cushion 100 of embodiment 17, wherein said uppermost fluid pervious layer length $L_U$ is from about 1.5 ft to about 6.0 ft (or any value between 1.5 ft and 6.0 ft, in increments of 0.1 ft, e.g., 2.3 ft, or any range of values between 1.5 ft and 6.0 ft, in increments of 0.1 ft, e.g., from 1.8 ft to about 4.2 ft); said uppermost fluid pervious layer width $W_U$ is from about 1.0 ft to about 4.0 ft (or any value between 1.0 ft and 4.0 ft, in increments of 0.1 ft, e.g., 3.1 ft, or any range of values between 1.0 ft and 4.0 ft, in increments of 0.1 ft, e.g., from 1.8 ft to about 3.2 ft); and said uppermost fluid pervious layer thickness $T_U$ is from about 0.05 in to about 1.0 in (or any value between about 05 in to about 1.0 in, in increments of 0.01 in, e.g., 0.20 in, or any range of values between about 05 in to about 1.0 in, in increments of 0.01 in, e.g., from 0.08 in to about 0.13 in).

19. The cushion 100 of any one of embodiments 1 to 18, wherein said lowermost fluid-impervious layer 30 has a lowermost fluid-impervious layer length $L_L$, a lowermost fluid-impervious layer width $W_L$, and a lowermost fluid-impervious layer thickness $T_L$, and said lowermost fluid-impervious layer length $L_L$ is greater than said lowermost fluid-impervious layer width $W_L$.

20. The cushion 100 of embodiment 19, wherein said lowermost fluid-impervious layer length $L_L$ is from about 2.0 ft to about 8.0 ft (or any value between about 2.0 ft to about 8.0 ft, in increments of 0.1 ft, e.g., 4.3 ft, or any range of values between about 2.0 ft to about 8.0 ft, in increments of 0.1 ft, e.g., from 3.8 ft to about 6.2 ft); said lowermost fluid-impervious layer width $W_L$ is from about 1.2 ft to about 5.0 ft (or any value between about 1.2 ft to about 5.0 ft, in increments of 0.1 ft, e.g., 3.1 ft, or any range of values between about 1.2 ft to about 5.0 ft, in increments of 0.1 ft, e.g., from 1.8 ft to about 3.2 ft); and said lowermost fluid-impervious layer thickness $T_L$ is from about 0.05 in to about 1.0 in (or any value between about 0.05 in to about 1.0 in, in increments of 0.01 in, e.g., 0.2 in, or any range of values between about 0.05 in to about 1.0 in, in increments of 0.01 in, e.g., from 0.2 in to about 0.3 in).

21. The cushion 100 of any one of embodiments 1 to 20, wherein said lowermost fluid-impervious layer 30 has a lowermost fluid-impervious layer width $W_L$ that is greater than (i) a foam layer width $W_{SA}$, (ii) an absorbent layer width $W_A$, and (iii) an uppermost fluid pervious layer width $W_U$.

22. The cushion 100 of any one of embodiments 1 to 21, wherein said lowermost fluid-impervious layer 30 has a lowermost fluid-impervious layer length $L_L$ that is greater than (i) a foam layer length $L_{SA}$, (ii) an absorbent layer width $W_A$ length $L_A$, and (iii) an uppermost fluid pervious layer length $L_U$.

23. The cushion 100 of any one of embodiments 1 to 22, wherein said absorbent layer 10 extends over an upper surface 25 of said foam layer 20 and along opposite side edges 26 of said foam layer 20 so as to come into contact with an upper surface 35 of said lowermost fluid-impervious layer 30.

24. The cushion 100 of any one of embodiments 2 to 23, wherein said uppermost fluid pervious layer 40 extends over an upper surface 15 of said absorbent layer 10 and along opposite side edges 16 of said absorbent layer 10 so as to come into contact with an upper surface 35 of said lowermost fluid-impervious layer 30.

25. The cushion 100 of any one of embodiments 1 to 24, wherein said cushion 100 comprises opposite raised edges 101 extending along a length L of said cushion 100, said opposite raised edges 101 representing uppermost points along an upper surface 105 of said cushion 100.

26. The cushion 100 of any one of embodiments 1 to 25, wherein said foam layer 20 comprises opposite raised edges (not shown) extending along a length of said foam layer 20, said opposite raised edges representing uppermost points along an upper surface 25 of said foam layer 20.

27. The cushion 100 of any one of embodiments 1 to 26, wherein said absorbent layer 10 comprises opposite raised edges 17 extending along a length of said absorbent layer 10, said opposite raised edges 17 representing uppermost points along an upper surface 15 of said absorbent layer 10.

28. The cushion 100 of any one of embodiments 2 to 27, wherein said uppermost fluid pervious layer 40 comprises opposite raised edges 47 extending along a length of said uppermost fluid pervious layer 40, said opposite raised edges 47 representing uppermost points along an upper surface 45 of said uppermost fluid pervious layer 40.

29. The cushion 100 of any one of embodiments 1 to 28, wherein said cushion 100 further comprises a tear line 110 extending (i) along a length of said cushion 100, (ii) within a central location 120 of said cushion 100, and (iii) thru all layers of said cushion 100 above said lowermost fluid-impervious layer 30, said tear line 110 enabling said cushion 100 to be torn into two separate pieces along the length of said cushion 100.

30. The cushion 100 of embodiment 29, wherein said tear line 110 within said foam layer 20 is represented by said dissecting channel 23 of embodiment 12.

31. The cushion 100 of embodiment 29 or 30, wherein said tear line 110 also extends thru said lowermost fluid-impervious layer 30.

32. The cushion 100 of any one of embodiments 29 to 31, wherein said tear line 110 comprises a plurality of holes 111 extending in a linear path along an upper surface 105 of said cushion 100.

33. The cushion 100 of any one of embodiments 1 to 32, wherein said cushion 100 further comprises one or more slits 115 extending thru all layers of said cushion 100, said one or more slits 115 enabling one or more straps (not shown) to extend thru said cushion 100.

34. The cushion 100 of embodiment 33, wherein said one or more slits 115 comprise a plurality of slits 115 extending along a width of said cushion 100.

35. The cushion 100 of embodiment 33 or 34, wherein said one or more slits 115 comprise (i) two or more shoulder slits 115a that enable one or more shoulder straps (not shown) to extend thru an upper portion 125 of said cushion 100, and (ii) at least one leg slit 115b that enable one or more leg straps (not shown) to extend thru a lower portion 130 of said cushion 100. Such a configuration enables attachment of said cushion 100 to a conventional car seat (not shown).

36. The cushion 100 of any one of embodiments 1 to 35, wherein said cushion 100 further comprises a closable pocket 140 within an upper end edge surface 141 of said cushion 100, said closable pocket 140 providing access to a portion of said foam layer 20.

37. The cushion 100 of embodiment 36, wherein said cushion 100 further comprises removable foam layer portions 20a, said removable foam layer portions 20a being sized so as to be removable thru said closable pocket 140.

38. The cushion 100 of embodiment 37, wherein each of said removable foam layer portions 20a has a foam layer portion length $L_{SAP}$ of from about 0.5 ft to about 2.0 ft (or any value between about 0.5 ft to about 2.0, in increments of 0.1 ft, e.g., 1.5 ft, or any range of values between about 0.5 ft to about 2.0, in increments of 0.1 ft, e.g., from 0.8 ft to about 1.2 ft); a foam layer portion width $W_{SAP}$ of from about 1.0 ft to about 4.0 ft (or any value between about 1.0 ft and 4.0 ft, in increments of 0.1 ft, e.g., 3.1 ft, or any range of values between 1.0 ft and 4.0 ft, in increments of 0.1 ft, e.g., from 1.8 ft to about 3.2 ft); and a foam layer portion thickness $T_{SAP}$ of from about 0.5 in to about 2.0 in (or any value between about 0.5 in to about 2.0 in, in increments of 0.1 in, e.g., 0.7 in, or any range of values between about 0.5 in to about 2.0 in, in increments of 0.1 in, e.g., from 0.5 in to about 1.0 in).

39. The cushion 100 of embodiment 37 or 38, wherein said removable foam layer portions 20a comprise two or more removable foam layer portions 20a stacked vertically on each other along a thickness of said cushion 100.

40. The cushion 100 of any one of embodiments 36 to 39, wherein said cushion 100 further comprises a closure device (not shown) for opening said closable pocket 140, said closure device comprising an adhesive tape, a mechanical fastener (e.g., a zipper), hoop-and-loop material, or any combination thereof.

Figure 12:
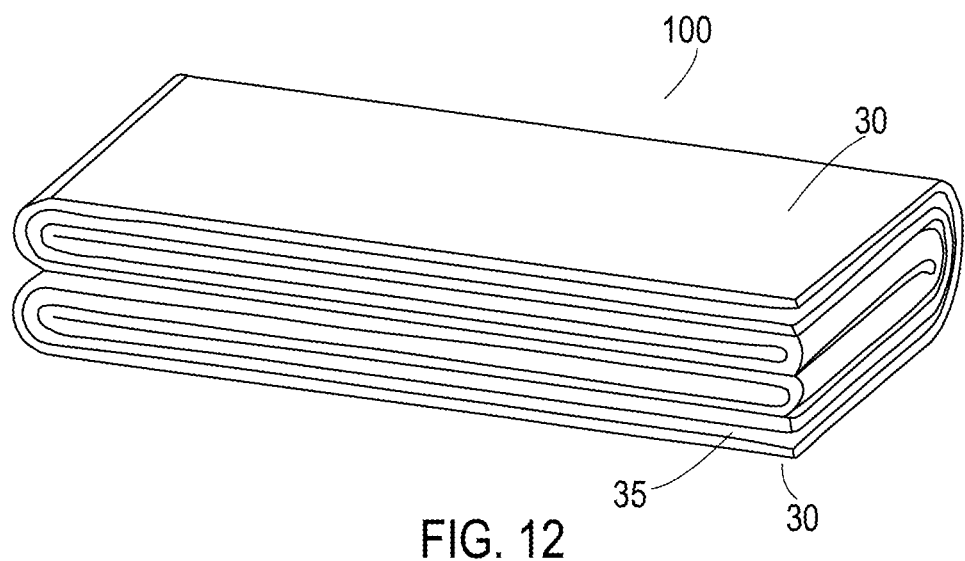
FIG. 12 depicts the exemplary cushion shown in FIG. 1 in a folded configuration suitable for storage purposes.

41. The cushion 100 of any one of embodiments 1 to 40, wherein said cushion 100 is individually vacuum packed in a package (not shown) to remove air and compress the cushion to a minimal height for improved storage, and upon opening of the package and exposure to air, said cushion 100 returns to a full height and will not reduce back to its packaged state. See, for example, the folded configuration of exemplary cushion 100 shown in FIG. 12.

42. The cushion 100 of any one of embodiments 1 to 41, wherein said cushion 100 is a single-use, disposable cushion 100.

43. The cushion 100 of any one of embodiments 1 to 42, wherein said foam layer 20 provides motion-limiting properties to cushion 100. In other words, the foam layer 20 conforms to a shape of a child (not shown) positioned on the cushion 100 and limits motion of the child when secured onto cushion 100.

44. The cushion 100 of any one of embodiments 1 to 43, wherein said foam layer 20 provides shock-absorbing properties to cushion 100. In other words, the foam layer 20 conforms to a shape of a child (not shown) positioned on the cushion 100 and absorbs the energy of impact at point of contact, limiting transference of the impact energy to the body of the child positioned on cushion 100 (i.e., when a vehicle in which cushion 100 is positioned experiences an external force thereon such as a vehicle collision or crash).

45. The cushion 100 of any one of embodiments 1 to 44, in combination with a conventional car seat (not shown), said cushion 100 being sized so as to be positioned along a child-receiving surface of the conventional car seat.

46. The cushion 100 of any one of embodiments 1 to 44, in combination with a car seat used in an ambulance (not shown), said cushion 100 being sized so as to be positioned along a child-receiving surface of the car seat used in an ambulance.

47. The cushion 100 of any one of embodiments 1 to 44, in combination with a PedRest™ child restraint device (not shown), said cushion 100 being sized so as to be positioned along a child-receiving surface of the PedRest™ child restraint device.

48. The cushion 100 of any one of embodiments 1 to 44, in combination with a child stretcher used in an ambulance (not shown), said cushion 100 being sized so as to be positioned along a child-receiving surface of the child stretcher used in an ambulance.

Methods of Making a Cushion:

49. A method of making the cushion 100 of any one of embodiments 1 to 44, said method comprising: assembling the absorbent layer 10, the foam layer 20 and the lowermost fluid-impervious layer 30 with one another to form an integrally connected unit 100.

50. The method of embodiment 49, further comprising: adding the uppermost fluid pervious layer 40 to the absorbent layer 10, the foam layer 20 and the lowermost fluid-impervious layer 30 so as to form an integrally connected unit 100.

51. The method of embodiment 49 or 50, wherein said assembling comprising: positioning the foam layer 20 on the lowermost fluid-impervious layer 30; positioning the absorbent layer 10 on the foam layer 20; and positioning the uppermost fluid pervious layer 40 on the absorbent layer 10.

Figure 7:
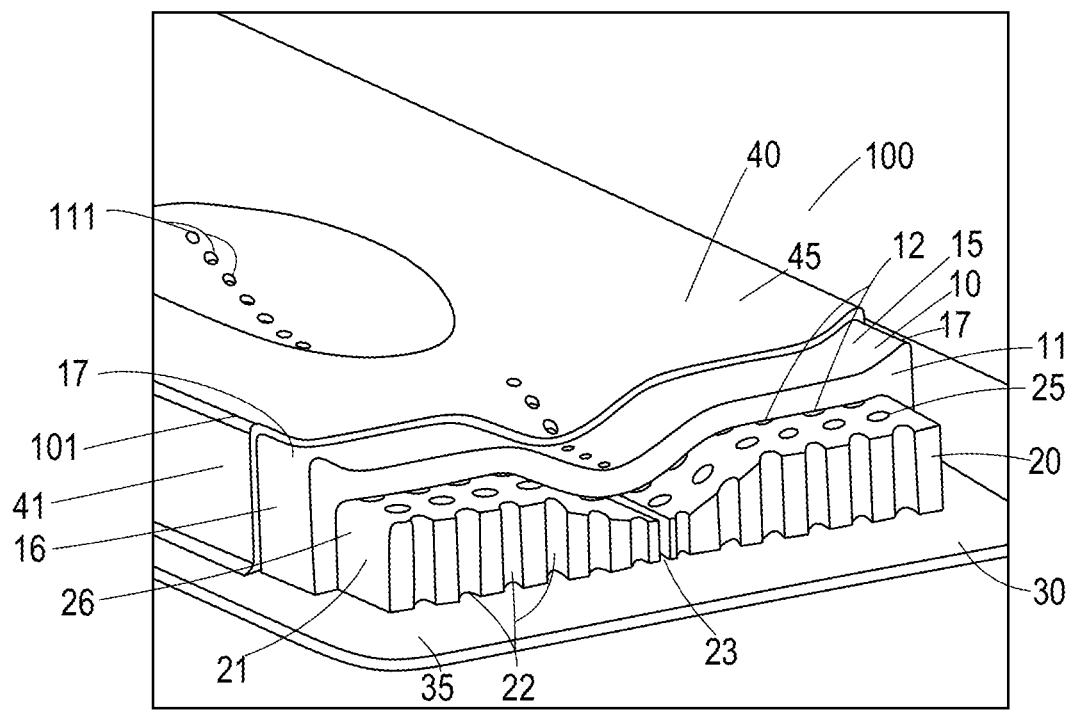
FIG. 7 depicts a cross-sectional view of exemplary layers within the exemplary cushion shown in FIG. 2 as viewed along line 7-7 shown in FIG. 2.

52. The method of any one of embodiments 49 to 51, wherein said assembling comprising: attaching outer edge portions of each of (i) the absorbent layer 10 and (ii) the uppermost fluid pervious layer 40 to the lowermost fluid-impervious layer 30. See, for example, FIGS. 7-8.

53. The method of any one of embodiments 49 to 52, said method further comprising one or more of the following steps: applying a water-repellent material onto and/or within the uppermost fluid pervious layer 40; forming a tear line 110 within one or more layers of the cushion 100; forming one or more slits 115 within one or more layers of the cushion 100; forming a plurality of channels 22 within the foam layer 20; forming a dissecting channel 23 within the foam layer 20; and forming a closable pocket 140 within an upper end edge surface 141 of the cushion 100.

54. The method of any one of embodiments 49 to 53, further comprising: individually vacuum packing the cushion 100 into a package (not shown) so as to remove air from the cushion 100 and reduce the cushion 100 to a packaged size and state. See again, for example, the folded configuration of exemplary cushion 100 shown in FIG. 12.

Methods of Using a Cushion:

55. A method of using the cushion 100 of any one of embodiments 1 to 44, said method comprising: positioning the cushion 100 on a surface of a transportable device (not shown), the cushion 100 providing (i) shock-absorbing and/or motion-limiting and/or motion-isolating and (ii) fluid-absorbing properties for a child (not shown) positioned on the cushion 100.

56. The method of embodiment 55, wherein the surface is a child-receiving surface of a conventional car seat (not shown).

57. The method of embodiment 55, wherein the surface is a child-receiving surface of a car seat used in an ambulance (not shown).

58. The method of embodiment 55, wherein the surface is a child-receiving surface of a PedRest™ child restraint device (not shown).

59. The method of embodiment 55, wherein the surface is a child-receiving surface of a child stretcher used in an ambulance (not shown).

60. The method of any one of embodiments 55 to 59, further comprising: releasably attaching the cushion 100 to the surface of the transportable device (not shown).

61. The method of any one of embodiments 55 to 60, further comprising: positioning one or more strap portions (not shown) thru one or more slits 115 within the cushion 100 so as to releasably attach the cushion 100 to the surface of the transportable device (not shown).

62. The method of any one of embodiments 55 to 61, further comprising: positioning a child (not shown) on the cushion 100.

63. The method of any one of embodiments 55 to 62, further comprising: removing one or more removable foam layer portions 20a from the cushion 100 via the closable pocket 140 of the cushion 100.

64. The method of any one of embodiments 55 to 63, further comprising: tearing the cushion 100 along the tear line 110 so as to have enhanced access to a child (not shown) on the cushion 100.

65. The method of any one of embodiments 55 to 64, further comprising: removing the cushion 100 from an individually and vacuum packed package (not shown), and upon opening of the package and exposure to air, allowing the cushion 100 to return to a full height and size for use (i.e., the cushion 100 typically not being reducable back to its packaged state). See again, for example, the folded configuration of exemplary cushion 100 shown in FIG. 12.

It should be understood that although the above-described cushions for the safe, sanitary transport of children, and/or methods of making and/or using the cushions are described as "comprising" one or more components or steps, the above-described cushions for the safe, sanitary transport of children, and/or methods of making and/or using the cushions may "comprise," "consists of," or "consist essentially of" any of the above-described components or steps of the cushions for the safe, sanitary transport of children, and/or methods of making and/or using the cushions. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a cushion for the safe, sanitary transport of children, and/or a method of making and/or using the cushion that "comprises" a list of elements (e.g., components or steps) is not necessarily limited to only those elements (or components or steps), but may include other elements (or components or steps) not expressly listed or inherent to the cushion and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define cushions for the safe, sanitary transport of children, and/or methods of making and/or using the cushions that include materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described cushions for the safe, sanitary transport of children, and/or methods of making and/or using the cushions may comprise, consist essentially of, or consist of any of the herein-described components and features, as shown in the figures with or without any feature(s) not shown in the figures. In other words, in some embodiments, the cushions for the safe, sanitary transport of children, and/or methods of making and/or using the cushions of the present invention do not have any additional features other than those shown in the figures, and such additional features, not shown in the figures, are specifically excluded from the cushions and/or methods. In other embodiments, the cushions for the safe, sanitary transport of children, and/or methods of making and/or using the cushions of the present invention do have one or more additional features that are not shown in the figures.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Preparation of Cushions

Exemplary cushions as shown in FIGS. 1-12 were prepared.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A cushion comprising:
   an absorbent layer comprising superabsorbent material or a combination of fibrous material and superabsorbent material;
   a foam layer;
   an uppermost fluid pervious layer comprising fiber-containing material; and
   a lowermost fluid impervious layer,
   wherein (I) said foam layer has a foam layer length $L_{SA}$, a foam layer width $W_{SA}$, and a foam layer thickness $T_{SA}$; and said foam layer length $L_{SA}$ is from about 1.5 feet (ft) to about 6.0 ft; said foam layer width $W_{SA}$ is from about 1.0 ft to about 4.0 ft; and said foam layer thickness $T_{SA}$ is from about 0.8 inches (in) to about 6.0 in; (II) said absorbent layer has an absorbent layer length $L_A$, an absorbent layer width $W_A$, and an absorbent layer thickness $T_A$, and said absorbent layer length $L_A$ is from about 1.5 ft to about 6.0 ft; said absorbent layer width $W_A$ is from about 1.0 ft to about 4.0 ft; and said absorbent layer thickness $T_A$ is from about 0.2 in to about 2.0 in; (III) said uppermost fluid pervious layer has an uppermost fluid pervious layer length $L_U$, an uppermost fluid pervious layer width $W_U$, and an uppermost fluid pervious layer thickness $T_U$, and said uppermost fluid pervious layer length $L_U$ is from about 1.5 ft to about 6.0 ft; said uppermost fluid pervious layer width $W_U$ is from about 1.0 ft to about 4.0 ft; and said uppermost fluid pervious layer thickness $T_U$ is from about 0.06 in to about 1.0 in; and (IV) said lowermost fluid-impervious layer has a lowermost fluid-impervious layer length $L_L$, a lowermost fluid-impervious layer width $W_L$, and a lowermost fluid-impervious layer thickness $T_L$, and said lowermost fluid-impervious layer length $L_L$ is from about 2.0 ft to about 8.0 ft; said lowermost fluid-impervious layer width $W_L$ is from about 1.2 ft to about 5.0 ft; and said lowermost fluid-impervious layer thickness $T_L$ is from about 0.1 in to about 1.0 in.

2. The cushion of claim 1, wherein the uppermost fluid pervious layer further comprises repellent material.

3. The cushion of claim 2, wherein said absorbent layer is below said uppermost fluid pervious layer, and said foam layer is below said absorbent layer.

4. The cushion of claim 1, wherein said foam layer comprising a viscoelastic material or a memory foam.

5. The cushion of claim 1, wherein said foam layer further comprises a plurality of parallel channels extending vertically into said foam layer.

6. The cushion of claim 5, wherein each of said parallel channels extends vertically thru said foam layer.

7. The cushion of claim 1, wherein (I) said lowermost fluid-impervious layer has a lowermost fluid-impervious layer width $W_L$ that is greater than (i) a foam layer width $W_{SA}$, (ii) an absorbent layer width $W_A$, and (iii) an uppermost fluid pervious layer width $W_U$; and (II) said lowermost fluid-impervious layer has a lowermost fluid-impervious layer length $L_L$ that is greater than (i) a foam layer length $L_{SA}$, (ii) an absorbent layer width $W_A$ length $L_A$, and (iii) an uppermost fluid pervious layer length $L_U$.

8. The cushion of claim 1, wherein said absorbent layer extends over an upper surface of said foam layer and along opposite side edges of said foam layer so as to come into contact with an upper surface of said lowermost fluid-impervious layer; and said uppermost fluid pervious layer extends over an upper surface of said absorbent layer and along opposite side edges of said absorbent layer so as to come into contact with an upper surface of said lowermost fluid-impervious layer.

9. The cushion of claim 1, wherein said cushion further comprises a tear line extending (i) along a length of said cushion, (ii) within a central location of said cushion, and (iii) thru all layers of said cushion above said lowermost fluid-impervious layer, said tear line enabling said cushion to be torn into two separate pieces along the length of said cushion.

10. The cushion of claim 1, wherein said cushion further comprises one or more slits extending thru all layers of said cushion, said one or more slits enabling one or more straps to extend thru said cushion, wherein said one or more slits comprise (i) two or more shoulder slits that enable one or more shoulder straps to extend thru an upper portion of said cushion, and (ii) at least one leg slit that enable one or more leg straps to extend thru a lower portion of said cushion.

11. The cushion of claim 1, wherein said cushion further comprises a closable pocket within an upper end edge surface of said cushion, said closable pocket providing access to a portion of said foam layer.

12. The cushion of claim 11, wherein said cushion further comprises removable foam layer portions, said removable foam layer portions being sized so as to be removable thru said closable pocket.

13. The cushion of claim 1, wherein said cushion is individually vacuum packed in a package to remove air and compress the cushion to a minimal height for improved storage, and upon opening of the package and exposure to air, said cushion returns to a full height and will not reduce back to its packaged state.

14. A single-use, disposable cushion comprising:
an uppermost fluid pervious layer comprising a nonwoven fabric;
an absorbent layer (i) positioned below said uppermost fluid pervious layer and (ii) comprising superabsorbent material or a combination of fibrous material and superabsorbent material;
a foam layer positioned below said absorbent layer, said foam layer comprising a viscoelastic material or a memory foam material;
a lowermost fluid-impervious layer positioned below said foam layer; and
one or more slits extending thru all layers of said cushion, said one or more slits enabling one or more straps to extend thru said cushion, wherein said one or more slits comprise (i) two or more shoulder slits that enable one or more shoulder straps to extend thru an upper portion of said cushion, and (ii) at least one leg slit that enable one or more leg straps to extend thru a lower portion of said cushion,
wherein (I) said foam layer has a foam layer length $L_{SA}$, a foam layer width $W_{SA}$, and a foam layer thickness $T_{SA}$; and said foam layer length $L_{SA}$ is from about 1.5 feet (ft) to about 6.0 ft; said foam layer width $W_{SA}$ is from about 1.0 ft; to about 4.0 ft and said foam layer thickness $T_{SA}$ is from about 0.8 inches (in) to about 6.0 in; (II) said absorbent layer has an absorbent layer length $L_A$, an absorbent layer width $W_A$, and an absorbent layer thickness $T_A$, and said absorbent layer length $L_A$ is from about 1.5 ft to about 6.0 ft; said absorbent layer width $W_A$ is from about 1.0 ft to about 4.0 ft; and said absorbent layer thickness $T_A$ is from about 0.2 in to about 2.0 in; (III) said uppermost fluid pervious layer has an uppermost fluid pervious layer length $L_U$, an uppermost fluid pervious layer width $W_U$, and an uppermost fluid pervious layer thickness $T_U$, and said uppermost fluid pervious layer length $L_U$ is from about 1.5 ft to about 6.0 ft; said uppermost fluid pervious layer width $W_U$ is from about 1.0 ft to about 4.0 ft; and said uppermost fluid pervious layer thickness $T_U$ is from about 0.06 in to about 1.0 in; and (IV) said lowermost fluid-impervious layer has a lowermost fluid-impervious layer length $L_L$, a lowermost fluid-impervious layer width $W_L$, and a lowermost fluid-impervious layer thickness $T_L$, and said lowermost fluid-impervious layer length $L_L$ is from about 2.0 ft to about 8.0 ft; said lowermost fluid-impervious layer width $W_L$ is from about 1.2 ft to about 5.0 ft; and said lowermost fluid-impervious layer thickness $T_L$ is from about 0.1 in to about 1.0 in.

15. A single-use, disposable cushion comprising:
an uppermost fluid pervious layer comprising a fiber-containing material;
an absorbent layer (i) positioned below said uppermost fluid pervious layer and (ii) comprising superabsorbent material or a combination of fibrous material and superabsorbent material;
a foam layer (i) positioned below said absorbent layer and (ii) comprising a viscoelastic foam;
a lowermost fluid and biomatter impervious layer positioned below said foam layer;
a tear line extending (i) along a length of said cushion, (ii) within a central location of said cushion, and (iii) thru all layers of said cushion above said lowermost fluid-impervious layer, said tear line enabling said cushion to be torn into two separate pieces along the length of said cushion; and
one or more slits extending thru all layers of said cushion, said one or more slits enabling one or more straps to extend thru said cushion, wherein said one or more slits comprise (i) two or more shoulder slits that enable one or more shoulder straps to extend thru an upper portion of said cushion, and (ii) at least one leg slit that enable one or more leg straps to extend thru a lower portion of said cushion,
wherein (I) said foam layer has a foam layer length $L_{SA}$, a foam layer width $W_{SA}$, and a foam layer thickness $T_{SA}$; and said foam layer length $L_{SA}$ is from about 1.5 feet (ft) to about 6.0 ft; said foam layer width $W_{SA}$ is from about 1.0 ft to about 4.0 ft; and said foam layer thickness $T_{SA}$ is from about 0.8 inches (in) to about 6.0 in; (II) said absorbent layer has an absorbent layer length $L_A$, an absorbent layer width $W_A$, and an absorbent layer thickness $T_A$, and said absorbent layer length $L_A$ is from about 1.5 ft to about 6.0 ft; said absorbent layer width $W_A$ is from about 1.0 ft to about 4.0 ft; and said absorbent layer thickness $T_A$ is from about 0.2 in to about 2.0 in; (III) said uppermost fluid pervious layer has an uppermost fluid pervious layer length $L_U$, an uppermost fluid pervious layer width $W_U$, and an uppermost fluid pervious layer thickness $T_U$, and said uppermost fluid pervious layer length $L_U$ is from about 1.5 ft to about 6.0 ft; said uppermost fluid pervious layer width $W_U$ is from about 1.0 ft to about 4.0 ft; and said uppermost fluid pervious layer thickness $T_U$ is from about 0.06 in to about 1.0 in; and (IV) said lowermost fluid-impervious layer has a lowermost fluid-impervious layer length $L_L$, a lowermost fluid-impervious layer width $W_L$, and a lowermost fluid-impervious layer thickness $T_L$, and said lowermost fluid-impervious layer length $L_L$ is from about 2.0 ft to about 8.0 ft; said lowermost fluid-impervious layer width $W_L$ is from about 1.2 ft to about 5.0 ft; and said lowermost fluid-impervious layer thickness $T_L$ is from about 0.1 in to about 1.0 in.

16. The cushion of claim 1, in combination with a car seat used in an ambulance, a child restraint device, or a child stretcher used in an ambulance, said cushion being sized so as to be positioned along a child-receiving surface of the car seat, the child restraint device or the child stretcher.

17. A method of using the cushion of claim 1, said method comprising:
  positioning the cushion on a surface of a transportable device, the cushion providing motion-isolating properties and fluid-absorbing properties to a child positioned on the cushion,
  wherein the surface is a child-receiving surface of a car seat used in an ambulance or the surface is a child-receiving surface of a child restraint device or the surface is a child-receiving surface of a child stretcher used in an ambulance.

18. The method of claim 17, further comprising:
  prior to said positioning step,
    removing the cushion from an individually and vacuum packed package, and
    opening the package to expose the cushion to air,
  wherein said opening step allows the cushion to return to a full height and size for use.

* * * * *